(No Model.)
E. M. BENTLEY.
ELECTRIC RAILWAY CONDUIT.
No. 446,419. Patented Feb. 17, 1891.
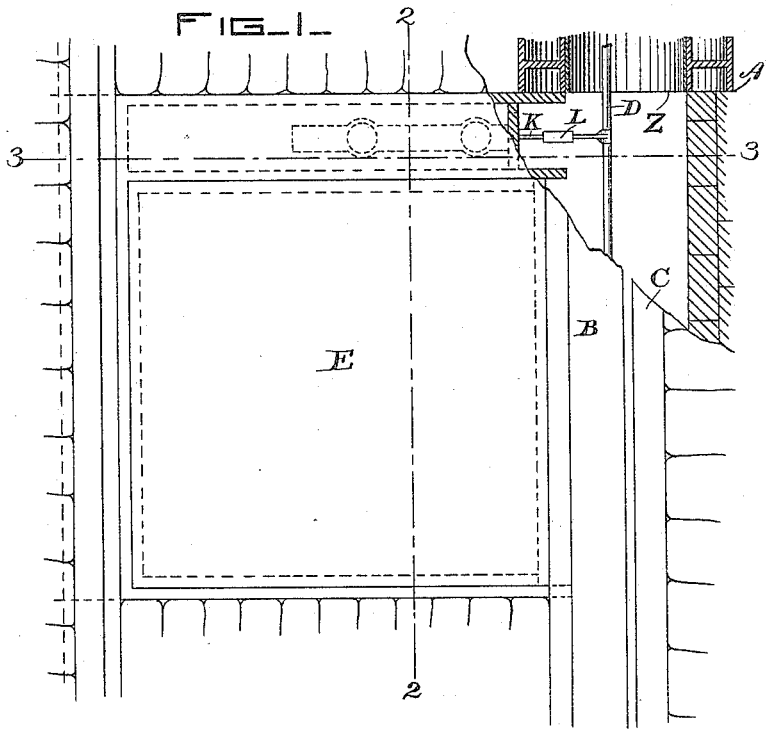
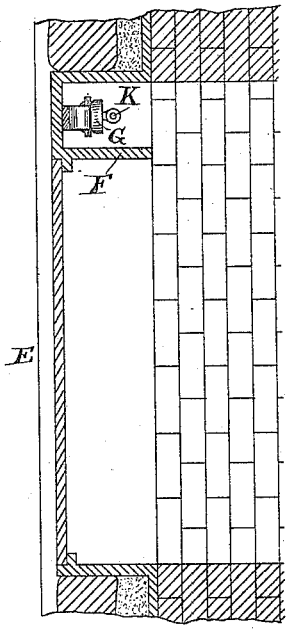
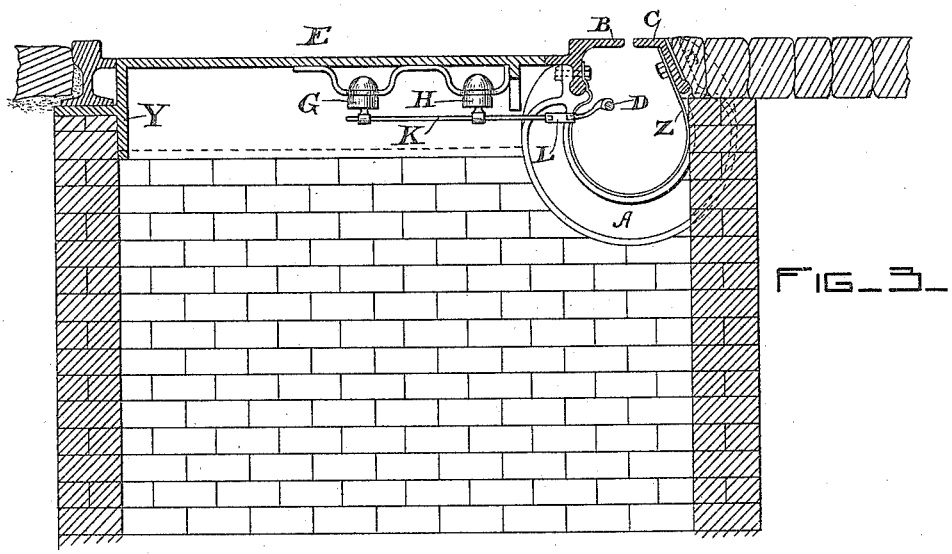
WITNESSES:
INVENTOR:
Edward M. Bentley
by Bentley & Knight
ATTYS.

UNITED STATES PATENT OFFICE.

EDWARD M. BENTLEY, OF BOSTON, MASSACHUSETTS.

ELECTRIC-RAILWAY CONDUIT.

SPECIFICATION forming part of Letters Patent No. 416,419, dated February 17, 1891.

Application filed April 9, 1890. Serial No. 347,161. (No model.)

*To all whom it may concern:*

Be it known that I, EDWARD M. BENTLEY, a citizen of the United States, residing at Boston, in the county of Suffolk and State of Massachusetts, have invented certain new and useful Improvements in Electric-Railway Conduits, of which the following is a specification.

My invention relates to an electric railway in which the supply-conductor is inclosed in a slotted conduit beneath the surface of the road; and it consists in certain means for supporting and insulating a conductor within a conduit of special construction.

Referring to the accompanying drawings, Figure 1 is a plan, partly in section, of a conduit and catch-pit. Fig. 2 is a longitudinal section on the line 2 2 of Fig. 1. Fig. 3 is a transverse section on the line 3 3 of Fig. 1.

In the drawings, A represents one of a series of yokes placed at intervals to form a framing for the conduit.

B and C are two slot-rails supported upon the said yokes and forming the upper part of the conduit. The conduit is completed by a sheet-iron bottom Z, placed inside the yokes and connecting the two slot-rails. The sheet-iron bottom Z and the two slot-rails form an open tube, with the yokes A for strengthening-ribs. One of the slot-rails B forms at the same time a bearing-rail for the track, and in order that it may serve this purpose the web is placed vertical and directly under the line of pressure, so as to give the best support possible. The rail is then provided with an extended flange overhanging the conduit and forming one edge of the slot.

I place at intervals along the conduit catch-pits, each of which occupies the space between the two adjacent yokes and between the outer rails of the track and the outer side of the conduit. In each of these catch-pits I place one or more insulators, from which is supported the conducting wire or cable D, by means of a transverse projection extending from the insulator to the conductor. The conductor D is supported in the conduit at as high a point as possible, and in order to accommodate it the lower flange of rail B is contracted from the ordinary flat shape into a form circular, or approximately so, in cross-sections. The insulators within the catch-pits are preferably provided with a separate compartment, formed in the instance shown by a flange F. Each catch-pit is constructed by completing, first, side walls of masonry, upon which is placed a rectangular frame, into which is set a cover E.

In the form illustrated the cover E is limited to the space outside of the compartment containing the insulators; but, if desired, it may extend over the whole of the catch-pit, or a separate cover may be provided for the insulator-compartment.

I have shown two supported insulators G and H, carried by hangers attached to the roof of the compartment in which they are placed. On the under side of each of the insulators is a loop of conducting material fastened to the insulator above and embracing a transverse rod K, which extends into the conduit and supports therein the conductor D. Preferably the rod K is firmly attached to the conductor D, and the expansion and contraction of the conductor are taken up by the variation in the sag of the conductor between its points of support.

Heretofore it has been customary to provide an elaborate sliding connection between sections of the rigid conductor and the conduit, and provide numerous supports upon which it is held. It has been a matter of great difficulty to make such an arrangement practicable. By my method, however, no sliding connection and no flexible joints between sections are necessary, and insulators are placed substantially at the catch-pits only, where they are easy of access and renewable without trouble.

The transverse rod K may, if desired, be provided with an insulating-ferrule L, or it may be entirely of non-conducting material.

What I claim as new, and desire to secure by Letters Patent, is—

1. The combination, in an electric railway, of a slotted conduit for the supply-conductor, a series of catch-pits along the said conduit, insulators in said catch-pits, and connections therefrom to the said conductor, by means of which it is supported.

2. The combination, with the supply-conductor of an electric railway, of an inclosing conduit, catch-pits placed at intervals along the conduit, insulators within the catch-pits, and connections from the said insulators firmly attached to the said conductor, whereby the expansion and contraction of the conductor are substantially taken up by the variation in sag between the points of support.

3. The combination, with a supply-conductor for an electric railway, of an inclosing conduit therefor, catch-pits placed at intervals along the said conduit, insulators in the said catch-pits, and transverse connections from the said insulators into the conduit from which the said supply-conductor is supported.

4. The combination, with a supply-conductor for an electric railway, of a slotted conduit therefor, catch-pits along said conduit, and insulators for the said supply-conductor supported in separate compartments in the said catch-pits.

5. The combination, in an electric railway, of a conduit outside the track-rails, pits in the space between the track-rails, an insulated conductor in the conduit, and insulating-supports therefor extending out transversely from the pits beneath the track-rails, as set forth.

6. The combination, in an electric railway, of a conduit, an insulated conductor therein, pits at intervals along the conduit, an insulator suspended from the roof or cover of the pit, and a supporting-rod between conductor and insulator, as set forth.

In witness whereof I have hereunto set my hand this 7th day of April, 1890.

EDWARD M. BENTLEY.

Witnesses:
  GEORGE L. MARVIN,
  GEO. R. BLODGETT.